2,997,463
Patented Aug. 22, 1961

2,997,463
PROCESS FOR THE PREPARATION OF POLYMERIC MATERIALS OF THE POLYAMIDE TYPE
Funston G. Lum, Richmond, Calif., assignor to California Research Corporation, San Francisco, Calif., a corporation of Delaware
No Drawing. Filed Mar. 18, 1957, Ser. No. 646,547
4 Claims. (Cl. 260—78)

This invention relates to a process for the preparation of polymeric material of the polyamide type.

In U.S. Patent No. 2,766,221, superpolymers of metaxylylene diamine and an aliphatic dicarboxylic acid of 6 to 10 carbon atoms are disclosed. Those polymers prepared from metaxylylene diamine and an aliphatic dicarboxylic acid having an even number of carbon atoms from 6 to 10, are crystalline in structure, and are useful as nylon-type fiber-forming materials, molding compositions, wire-coating compositions and the like.

It has now been found in accordance with the present invention that the foregoing polymers prepared from metaxylylene diamine require conditions different from those of the prior art, e.g., U.S. Patents Nos. 2,163,636 and 2,165,253, which show the preparation of polyamides from hexamethylene diamine, in order to minimize the decomposition of the metaxylylene diamine. It has been ascertained that in the preparation of a suitable polymer from metaxylylene diamine and of acid material of the type hereinabove described, decomposition of the amino groups to ammonia should not exceed about 0.10% and preferably not more than about 0.05%, especially if high-viscosity polymers are desired.

We have ascertained that the decomposition of meta-xylylene diamine with the liberation of ammonia, gives rise to the formation of branched and cross-linked polymers, which are difficult to process into high-tenacity fibers. A probable decomposition reaction of metaxylylene diamine which may give rise to the observed cross-linking is the formation of dixylylene triamine as follows:

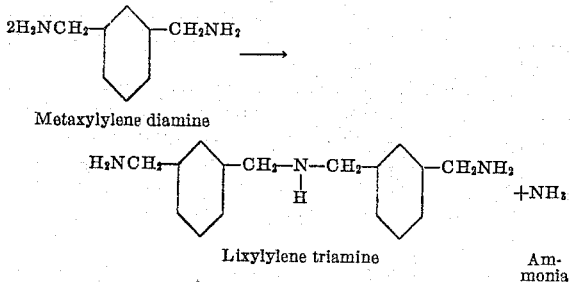

The presence of triamine formed in accordance with the above equation produces branching or cross-linking during polymerization, thus resulting in an inferior polymeric material which presents problems in spinning, extruding and the like.

Simply stated, the present invention has to do with the discovery of those conditions during the polymerization reaction which, when followed, do not result in the decomposition of amino groups above the tolerable limit.

As pointed out in U.S. Patent No. 2,766,221, the novel superpolyamides contemplated thereby can be prepared essentially by condensing metaxylylene diamine and an aliphatic dicarboxylic acid of 6 to 10 carbon atoms to produce a high polymer having a molecular weight generally above 10,000. The polymer can be prepared by heating the diamine and the acid in a reaction vessel from which the water formed in the condensation reaction is removed by distillation or other suitable means. In accordance with the invention, the preparation of the polymer involves a four-step procedure, namely, (1) forming a nylon salt solution or slurry, (2) concentrating the solution or slurry by evaporation to 80–95% concentration, preferably 90%, (3) forming a low polymer of reduced viscosity at 0.5% in meta-cresol between 0.4 and 0.7 from the wet salt of step 2 by imposing superatmospheric steam pressure in the range 40 p.s.i.g. to 150 p.s.i.g., heating to a temperature of about 410° to 450° F. at a rate of 50° to 125° F. per hour, while maintaining the selected superatmospheric pressure by venting steam from the vapor phase of the reaction vessels, (4) forming a high polymer of reduced viscosity in the range 0.9 to 2.0 by dropping the pressure to atmospheric or below and heating the low polymer to between 470° and 520° F.

Nylon salts of metaxylylene diamine and an aliphatic dicarboxylic acid of 6 to 10 carbon atoms can be prepared by neutralizing with a stoichiometric amount of dibasic acid to form an aqueous nylon salt solution or slurry. The salt solution or slurry may be used directly after the addition of a viscosity stabilizer (see U.S. Patent No. 2,163,584), or the salt may be separated upon the addition of a low-molecular weight alcohol, e.g., isopropanol, to insure substantial equivalency of the reactants (see U.S. Patent No. 2,130,947). The precipitated nylon salts can be separated by any suitable means for separating solids and liquids, e.g., filtration, centrifuging, etc. The separated salt, together with viscosity stabilizer and water can then be charged to the kettle and polymerized as mentioned above. In this case, the evaporation step may be omitted by using only sufficient water to give any desired concentration of salt.

We have now found that in using this method in preparing the polymer, critically related conditions of water content, time, pressure and temperature must be employed to produce high-quality polymers. While superatmospheric steam pressure is required to retain sufficient water in the reaction mixture to prevent or inhibit solidification of the polymer at temperatures below the melting point, it has been found that high steam pressures increase decomposition of metaxylylene diamine. Accordingly, it has been found that the polymerization reaction, which involves the release of water, proceeds satisfactorily within about a pressure range of 40 p.s.i.g. to 150 p.s.i.g., preferably 60 p.s.i.g. to 100 p.s.i.g. For best results, the selected pressure is maintained substantially constant during the period of formation of the low polymer by release of steam from the vapor phase of the reaction mix in the autoclave.

Thus, in one embodiment of the invention the nylon salt obtained from the reaction of, say, stoichiometric amounts of metaxylylene diamine and a suitable acid, e.g., adipic, can be polymerized to the final polymer by a process which involves heating in an autoclave from which oxygen has been removed by an inert gas, e.g., nitrogen, an aqueous salt mixture of 80 to 95%, preferably 90%, salt, to a constant pressure of about 40 p.s.i.g. to 150 p.s.i.g., preferably 60 to 100 p.s.i.g., until a temperature of about 410° to 450° F. is reached, the heating time varying from ¾ hour to 2 hours as the selected pressure is maintained by venting steam from the vapor phase in the autoclave. The pressure is then released to atmospheric, or below, to remove water, and the polymerization reaction continued by heating to a temperature between about 470° and 520° F. for a period of time varying from about one hour to 3 hours or until a polymer of the desired reduced viscosity is produced, i.e., one having a value of about 0.9 to 2, and preferably 1.2 to 1.6 and defined as $$\left[\frac{\text{Specific viscosity}}{\text{Concentration}}\right]$$

values at 0.5% in m-cresol.

In another embodiment of the invention, the polyamide-forming reactants of metaxylylene diamine and a suitable aliphatic dicarboxylic acid or the salt thereof are heated in the presence of a sufficient amount of water in fluid condition, a suitable amount of water ranging from about 20% to 50% by weight of the total reaction mixture. The reaction mixture is then heated under controlled conditions of temperature and time to remove the water to a solids content of the mixture ranging approximately from 80% to 95%, preferably around 90%. In order to minimize decomposition of the amino groups, the water is evaporated by heating up to a temperature not exceeding about 300° F. and for a period of time not exceeding about 4 to 5 hours, the temperature during this time being sufficiently high to maintain the reaction mass in fluid condition. When the mixture of desired solids content has been reached, a lower polymer of viscosity between 0.4 to 0.7 is formed by heating the reaction mixture at a constant pressure of about 40 p.s.i.g. to 150 p.s.i.g., preferably 60 p.s.i.g. to 100 p.s.i.g., at a rate of 50° to 125° F. per hour, until a temperature of about 410° F. to about 450° F. is reached. Pressure is then released and heating to a higher temperature of about 470° to 520° F. is continued in order to produce a high polymer of desired viscosity, i.e., one ranging from about 0.9 to 2, as hereinbefore defined.

In carrying out the polymerization reaction, suitable apparatus is an autoclave which is employed in the preparation of polyamides of the nylon type, such as is described, for example, in the above-mentioned U.S. Patent No. 2,163,636. While agitation during reaction is not essential, it is preferred that the reaction mass be stirred or agitated during the course of the reaction. Conventional practice is also followed in that the polymerization reaction is carried out in the absence of oxygen and that a blanket of an inert gas such as oxygen-free nitrogen, carbon dioxide and the like be provided during reaction.

It is also preferred to effect the polymerization reaction in the presence of a viscosity stabilizer, this again also in accordance with prior art practice, for example, as described in U.S. Patent No. 2,163,636. Thus, a suitable viscosity stabilizer can be an excess of one or the other of the polyamide reactants, acetic acid, metaxylylene diacetate, and the like. Preferably employed is an excess of the aliphatic dicarboxylic acid, e.g., adipic. An excess of 0.5 mol percent to 1.5 mol percent of the acid will be found to be satisfactory.

It is also to be pointed out that a portion of metaxylylene diamine can be replaced by other polyamide-forming diamines, such as shown in the aforementioned patents and in U.S. Patent No. 2,190,770, e.g., hexamethylene diamine. Copolymers having outstanding fiber-forming properties can be formed from metaxylylene diamine of which from about 5% up to as much as 50% has been replaced with hexamethylene diamine. Similarly, a mixture of the acids can be employed. However, where a polymer of the highest degree of crystallinity is desired a single aliphatic $\alpha,\omega$-dicarboxylic acid having an even number of 6 to 10 carbon atoms is most advantageously employed.

In order further to illustrate the practice of the invention the following examples are given.

Example 1

About 3640 g. of a metaxylylene diamine-adipic acid salt mixture containing 4% moisture, 12.7 g. of adipic acid, and 1500 g. of water were charged to an autoclave. The resulting mass was a fluid slurry comprising approximately one part, by weight, of salt solution, to one part, by weight, of undissolved salt at room temperature. The mixture was heated to the boiling point with stirring, and the water distilled at atmospheric pressure until approximately 1000 cc. of water was collected, thus leaving a salt concentration of about 84–85% or a slurry roughly comprising about one part of salt solution, by weight, to one and one-half, by weight, of undissolved salt. At this point the autoclave was closed, and heating continued. At a temperature of about 260° F. to 280° F. and a pressure of about 5 to 30 p.s.i.g. steam was bled from the autoclave to a salt content of 90%. Heating was continued to a steam pressure of 65 p.s.i.g. and a temperature of about 350° F. in roughly one hour, after which steam was bled from the autoclave, while heating to maintain a constant pressure of approximately 65 p.s.i.g. The pressure was maintained at 65 p.s.i.g. over a period of about one hour. During this period the temperature of the contents of the autoclave rose to about 420° F. and about two-thirds of the water of condensation was removed from the reaction mix. The pressure was then allowed to drop to atmospheric at which point about 90 to 95% of the water of condensation had been removed. Heating was continued at atmospheric until the polymer reached a temperature of about 495° F. Vacuum (5 cm. of mercury, absolute pressure) was then applied and heating continued for 1¼ hours to a final temperature of about 520° F. and removing essentially all of the water of condensation. The yield of polymer not counting hold-up was 2230 g. The product had a reduced viscosity of 1.42 and was processed into high-tenacity fibers by melt-spinning, warm-drawing of the spun fibers, and hot-stretching of the drawn fibers. The decomposition of amine groups to ammonia was 0.02%.

Example 2

This run was made under conditions which are suitable for the production of hexamethylene adipamide. In this run, the initial salt concentration was about 60% and the pressure in the autoclave was allowed to rise from atmospheric to 250 p.s.i. over a period of two hours without removing any water. At this pressure the reaction mix had reached a temperature of 400° F. The pressure was held constant by bleeding steam while the temperature rose to about 490° F. over a period of 2¾ hours. At this point one-third of the water of reaction was removed. The pressure was then dropped to atmospheric and the polymerization completed as above. The decomposition of amino groups to ammonia was 0.29%. The finished polymer had a reduced viscosity of 1.39, and could be melt-spun. Though the spun fibers could be warm-drawn slowly by hand, they, however, could not be warm-drawn even on laboratory equipment at the low rate of approximately 70 feet per minute.

One possible explanation for this poor fiber-forming property of polyamides having high decomposition is the probable formation of branched or cross-linked polymers. To obtain absolute proof that cross-linking does occur as a result of the decomposition of metaxylylene diamine, the following run was made at still higher pressure.

Example 3

This run was similar to Example 2 except for the use of a steam pressure of 500 p.s.i. (which is still applicable to the preparation of hexamethylene diamine polyamides, see, e.g., U.S. Patent No. 2,163,636). Because of the use of this higher pressure, the temperature of the reaction mix was slightly higher, about 20° F., throughout most of the pressure cycle at the same water content. The pressure, however, was reduced to atmospheric when the temperature was 490° F., and the polymerization was completed as above. The finished polymer was only partially discharged because it had gelled in the kettle, showing that the polymer was cross-linked. The decomposition of amino groups to ammonia was 1.3%. Because the polymer was cross-linked it could not be completely dissolved in m-cresol for viscosity determination. This run definitely shows the decomposition of metaxylylene diamine results in the formation of tri or higher functional reactants, which may be the dixylylene triamine formation mentioned above.

Example 4

To determine the approximate level of metaxylylene diamine decomposition which will produce gelation, a run was made at 400 instead of 500 p.s.i. The polymer was still fluid after the usual 1 to 2 hours under vacuum, but gelled within another half hour under vacuum. In this run, the ammonia resulting from the decomposition of the amino groups was 0.8%, which appears to be the critical level for gelation when the above amount of viscosity stabilizer and reaction cycles are used.

*Example 5*

To determine the critical decomposition level at which polymers of poor fiber-forming properties result, a run similar to Example 2 was made. In this run, the pressure was allowed to rise from atmospheric to 175 p.s.i. over a period of about 1.0 hour. At this point, the temperature of the reaction mix was 380° F. The pressure was held constant by bleeding steam while the temperature rose to about 420° F. over a period of 1¼ hours. At this point the reaction mix corresponded to approximately the straight salt, and 0.09% of the amino groups in the metaxylylene diamineadipic acid salt had already decomposed to ammonia. To minimize further decomposition the pressure was then dropped and the polymerization completed under vacuum as before at temperatures ranging up to 510° F. The finished polymer had a reduced viscosity of 1.51, and could be melt-spun. The spun fibers could only be warm-drawn slowly at low draw ratios of 3.5:1, and it was not possible to hot-stretch them to the same high tenacity as those of Example 1. The total decomposition of amino groups to ammonia during the entire polymerization was 0.13, indicating a tolerable limit in the order of about 0.1%.

In numerous other runs similar to Example 1 where the salt concentration was raised to about 90% before reaching a temperature of 300° F., it was found that superatmospheric pressures of 40 to 150 p.s.i. will result in amino decomposition of less than 0.1%, and the preferred range of 40 to 100 p.s.i. giving less than 0.05%.

I claim:
1. Process for producing metaxylylene superhomopolyamides which comprises subjecting in a reaction zone an aqueous polyamide-forming salt mixture of metaxylylene diamine and a linear $\alpha,\omega$-aliphatic dicarboxylic acid of 6 to 10 carbon atoms, said mixture having a concentration of about 80 to 95%, the said metaxylylene diamine and aliphatic dicarboxylic acid being the sole polyamide-forming reactants, to a temperature within about the range of 410° to 450° F. during a period of time of ¾ to 2 hours and under a pressure within about the range 40 to 150 p.s.i.g., removing water from the reaction zone to maintain the pressure within the specified pressure range and to produce a low polymer of reduced viscosity within about the range of 0.4 to 0.7 at 0.5% in m-cresol, depressuring the reaction zone to atmospheric pressure, heating the polymer at atmospheric pressure to a temperature below about 495° F. and finally heating the polymer under vacuum to a temperature below about 520° F. to remove essentially all of the water of condensation to produce a high polymer having a reduced viscosity in the range 0.9 to 2 at 0.5% in m-cresol.

2. A process according to claim 1 wherein the aliphatic dicarboxylic acid is one having an even number of 6 to 10 carbon atoms.

3. A process according to claim 2 wherein the aliphatic dicarboxylic acid is adipic acid.

4. A process according to claim 3 wherein the pressure employed to form the low polymer is maintained between about 60 to about 100 p.s.i.g.

References Cited in the file of this patent

UNITED STATES PATENTS

| | | |
|---|---|---|
| 2,163,636 | Spanagel | June 27, 1939 |
| 2,252,554 | Carothers | Aug. 12, 1941 |
| 2,766,221 | Lum et al. | June 4, 1953 |
| 2,916,475 | Caldwell et al. | Dec. 8, 1959 |

OTHER REFERENCES

Carlston et al.: Industrial and Engineering Chemistry, vol. 49, pp. 1239–1240 (August 1957).